United States Patent [19]

Vandepopuliere et al.

[11] Patent Number: 6,004,603

[45] Date of Patent: *Dec. 21, 1999

[54] METHOD OF CONTROLLING SALMONELLA IN SHELL EGGS

[75] Inventors: Joseph M. Vandepopuliere; Owen J. Cotterill, both of Columbia, Mo.

[73] Assignee: University of Missouri System at Columbia, Columbia, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/769,579

[22] Filed: Dec. 19, 1996

Related U.S. Application Data

[63] Continuation of application No. 08/178,734, Jan. 7, 1994, abandoned.

[51] Int. Cl.[6] .............................. A23B 5/00; A23L 1/32; A23C 1/00
[52] U.S. Cl. .......................... 426/298; 426/300; 426/614; 426/520; 426/521
[58] Field of Search .................................. 426/298, 300, 426/614, 520, 521

[56] References Cited

U.S. PATENT DOCUMENTS

| | | | |
|---|---|---|---|
| 1,092,897 | 4/1914 | Clairemont | 426/300 |
| 2,423,233 | 8/1947 | Funk . | |
| 2,497,817 | 2/1950 | Hale et al. . | |
| 2,500,396 | 3/1950 | Barker . | |
| 2,550,189 | 4/1951 | Droege et al. . | |
| 2,576,236 | 11/1951 | Paden . | |
| 2,618,216 | 11/1952 | Mulvany . | |
| 2,673,160 | 3/1954 | Feeney et al. | 426/298 |
| 2,725,062 | 11/1955 | Vile . | |
| 2,936,240 | 5/1960 | Kauffman et al. . | |
| 3,041,212 | 6/1962 | Booth . | |
| 3,144,342 | 8/1964 | Collier et al. . | |
| 3,211,659 | 10/1965 | Pikaar . | |
| 3,561,980 | 2/1971 | Sourby et al. . | |
| 3,830,945 | 8/1974 | Scharfman . | |
| 4,562,790 | 1/1986 | Leffke . | |
| 5,431,939 | 7/1995 | Cox et al. . | |
| 5,589,211 | 12/1996 | Cox et al. | 426/614 |

FOREIGN PATENT DOCUMENTS

| | | |
|---|---|---|
| 459566 | 9/1946 | Canada . |
| 701272 | 1/1965 | Canada . |
| 72454 | 3/1949 | Netherlands . |
| 612503 | 11/1948 | United Kingdom . |
| 93/03622 | 3/1993 | WIPO . |

OTHER PUBLICATIONS

Van Lith, L.A.J.T. et al.; *Pasteurization of table eggs to eliminate Salmonellae*; Arch. Geflügelk, 1995, 59 (2), 157–160.

Hou, H. et al.; *Pasteurization of intact shell eggs;*, Food Microbiology, 1996, 13, 93–101.

Stadelman, W.J. et al.; *Pasteurization of Eggs in the Shell*; Poultry Science, Sep. 1996, 75 (9) pp. 1122–1125.

E.M. Funk, *Pasteurization of Shell Eggs* (1943) U. of Missouri Res. Bulletin, 364:1–28.

(List continued on next page.)

*Primary Examiner*—Anthony J. Weier
*Attorney, Agent, or Firm*—Myers Bigel Sibley & Sajovec

[57] ABSTRACT

The present invention relates to producing a safer shell egg through thermal treatment. The present invention provides methods of producing a shell egg wherein the albumen and the yolk of the shell egg receives a thermal treatment sufficient to pasteurize the shell egg and thereby combat the risk of salmonella. The present invention provides methods of providing thermal treatments to the shell egg through introduction of the shell egg into an aqueous solution of a predetermined temperature and maintaining the shell egg in the solution for a predetermined time sufficient to cause the required reduction in salmonella. The predetermined times and temperatures may be characterized by use of the equivalent point method of thermal evaluation, by use of the $F_O$ line for shell egg or by other methods of determining the reduction in salmonella.

10 Claims, 2 Drawing Sheets

OTHER PUBLICATIONS

Romanoff, A. L., et al., *A Study of Preservation of Eggs by Flash Heat Treatment*, Cornell University, Dec. 8, 1943.

Goresline, H. E., et al., Pasteurization of Liquid Whole Egg Under Commercial Conditions to Eliminate Salmonella, U.S. Dept. of Agriculture Circular No. 897, Oct. 1951.

Cotterill, O.J., Equivalent Pasteurization Temperatures to Kill Salmonellae in Liquid Egg WHite at Various pH Levels, *Poultry Science*, vol. 47, pp. 354–365 (1968).

Hammack, Thomas S., et al., Research Note: Growth of *Salmonella enteritidis* in Grade A Eggs During Prolonged Storage, *Poultry Science*, vol. 72, pp. 373–377 (1993).

Beard, Charles, et al., Where are we with S.e.?, *Egg Industry*, Jul./Aug. 1992.

Gast, R. K., et al., Detection and Enumeration of *Salmonella enteritidis* in Fresh and Stored Eggs Laid by Experimentally Infected Hens, *Journal of Food Protection*, vol. 55, No. 3, pp. 152–156 (Mar. 1992).

Shah, D. B., et al., Thermal Resistance of Egg–Associated Epidemic Strains of *Salmonella enteritidis*, *Journal of Food Science*, vol. 56, No. 2, pp. 391–393 (1991).

Chapman, P. A., et al., *Salmonella typhimurium* phage type 141 infections in Sheffield during 1984 and 1985; association with hens' eggs, *Epidem. Inf.*, vol. 101, pp. 75–82 (1988).

*Salmonella Enteritidis* in Eggs—Just the Facts, *Commercial Layers Newsletter, Poultry Science*, vol. IV–CE, No. 1 (May 1988).

Eilers, J. R., *Salmonella enteritidis, Food Processing*, pp. 240–242 (May 1991).

Coyle, E. F., et al., *Salmonella Enteritidis* Phage Type 4 Infection: Association with Hens' Eggs, *The Lancet*, pp. 1295–1298 (Dec. 3, 1988).

Lin, Feng–Ying C., et al., Investigation of an Outbreak of *Salmonella Enteritidis* Gastroenteritis Associated with Consumption of Eggs in a Restaurant Chain in Maryland, *American Journal of Epidemiology*, vol. 128, No. 4, pp. 839–844 (1988).

Osborne, W. W., et al., *Heat Resistance of Strains of Salmonella in Liquid Whole Egg, Egg Yolk, and Egg White*, pp. 451–463.

Ayres, J. C., et al., Destruction of Salmonella in Egg Albumen, *Journal Paper No. J. 1601, Iowa Agricultural Experiment Station, Project No. 970*, pp. 180–183.

Eggs and Egg Products, *Microbial Ecology of Foods, Vol. II, Food Commodities*, pp. 534–635 (1980).

*Egg Pasteurization Manual* (Mar. 1969).

Stadelman, W. J., The Preservation of Quality in Shell Eggs, *Egg Science & Technology, 3rd Edition*, pp. 63–73 (1986).

Swartzel, K. R., Equivalent–Point Method of Thermal Evaluation of Continuous–Flow Systems, *Agricultural and Food Chemistry*, vol. 34, pp. 396–401 (May/Jun. 1986).

Cotterill, O. J., et al, Thermal Destruction Curves for *Salmonella oranienburg* in Egg Products, *Poultry Science*, vol. 52, pp. 568–577 (1973).

Food Industries. "Washes and Pasteurizes Eggs", Mar. 1948. p. 71.

Feeney et al., Food Technology, May 1954. "High Temperature Treatment of Shell Eggs". pp. 242–245.

H. E. Goresline, et al., Thermostabilization of Shell Eggs: Quality Retention in Storage, *United States Department of Agriculture Circular*, No. 898 (1952).

Treating Shell Eggs to Maintain Quality, *North Central Regional Publication—University of Missouri*, No. 62 (1955).

Stabilizing Quality in Shell Eggs, *Research Bulletin*, No. 362 (1943).

Heat Treating Shell Eggs: Opacity and infertility produced by thermostabilization process at 125° F. and 144° F., *The U.S. Egg and Poultry Magazine*, pp. 320–322 (1943).

Salton, et al., VI. The Effect of Pasteurization of Bacterial Rotting, *Studies in the Preservation of Shell Eggs*, pp. 205–222.

Swartzel, Equivalent–Point Method for Thermal Evaluation of Continuous–Flow Systems, *Journal of Agricultural and Food Chemistry*, vol. 34, pp. 396–401(1986).

Egg Pasteurization Manual, *U.S.D.A* (1969).

Van Lith, L.A.J.T. et al.; Pasteurization of table eggs to eliminate *Salmonellae*; Arch. Geflügelk, 1995, 59 (2), 157–160.

Hou, H. et al.; Pasteurization of intact shell eggs; Food Microbiology, 1996, 13, 93–101.

Stadelman, W.J. et al.: Pasteurization of Eggs in the Shell; Poultry Science, Sep. 1996, 75 (9) pp. 1122–1125.

Van Lith, L.A.J.T. et al.; *Pasteurization of table eggs to eliminate Salmonellae*; Arch. Geflügelk, 1995, 59 (2), 157–160.

Hou, H. et al.; *Pasteurization of intact shell eggs*; Food Microbiology, 1996, 13, 93–101.

Stadelman, W.J. et al.: *Pasteurization of Eggs in the Shell*; Poultry Science, Sep. 1996, 75 (9) pp. 1122–1125.

METHOD OF CONTROLLING SALMONELLA IN SHELL EGGS

This application is a continuation of application Ser. No. 08/178,734, filed Jan. 7, 1994, now abandoned.

FIELD OF THE INVENTION

The present invention relates to methods for pasteurizing shell eggs. More particularly the present invention relates to methods for reducing or eliminating Salmonella from shell eggs and for improving the storage capabilities of shell eggs.

BACKGROUND OF THE INVENTION

It is well known that Salmonella organisms have been associated with egg products. More recently, *Salmonella enteritidis* (SE) has been detected within shell eggs. Presently, the presence of Salmonella within the shell egg is a major concern. Some states have enacted legislation preventing the serving of unpasteurized egg products unless fully cooked. In fact, since as early as 1969, the USDA has overseen the processing of liquid egg removed from the shell to reduce the level of Salmonella contamination to acceptable levels. However, no commercially acceptable methods have been developed to combat Salmonella in shell eggs. Since shell eggs must be used in situations where a liquid egg product cannot, it is therefore desirable to develop a commercially acceptable process for the reduction of Salmonella within shell eggs to provide a safe and functionally acceptable shell egg to the consumer.

Thermal treatments of shell egg to prevent embryonic growth in fertile eggs, to reduce incidence of spoilage during long term storage, and maintain internal quality received considerable research attention from about 1943 to about 1953. This research resulted from the nature of the egg industry at that time in that most of the eggs were produced by small flocks and the majority of the eggs used by the food industry were collected as seasonal surpluses in the spring. As a result of the production practices the eggs were more likely to lose interior quality or become unfit for human consumption because of bacterial growth or embryonic development. Research into "thermostabilization" was directed at solving these problems, which were largely perceived as embryonic growth and the contamination of the egg from contaminants external to the shell. (See Egg Science, Chapter 4, 3d Ed., 1986).

U.S. Pat. No. 2,423,233 to Funk describes the thermostabilization of shell eggs. The '233 patent described a process of heating the shell egg to arrest embryonic development in the egg. As described in the '233 patent, when heating with water the preferred times and temperatures for the heat treatment were 138 degrees Fahrenheit for from five to ten minutes. However, the work of Dr. Funk was not concerned with the elimination of pathogenic organisms. In fact, the times and temperatures suggested by Dr. Funk for heating with water would not be sufficient to cause high enough levels of *Salmonella enteritidis* destruction to insure that a safe shell egg would result. Furthermore, because eggs available through modern production and distribution are fresher and have a lower pH they require a different thermal process than was used by Funk.

Accordingly, it is one object of the present invention to provide a safe shell egg product which is essentially free of Salmonella and more preferably free of *Salmonella enteritidis*.

It is another object of the present invention to provide a commercially acceptable process for reducing the levels of *Salmonella enteritidis* in shell eggs to acceptable levels.

It is still a further object of the present invention to provide a method of producing a Salmonella negative shell egg without requiring additional thermal treatments which could reduce the functionality of the shell egg.

SUMMARY OF THE INVENTION

The present invention provides methods for producing a pasteurized shell egg while retaining the normal appearance of the shell egg contents. The present invention, therefore, relates to a commercially viable method of producing a pasteurized shell egg. One particular embodiment of the present invention involves heating the shell egg in an aqueous solution of a predetermined temperature for a predetermined time. The heating at a predetermined time for a predetermined temperature provide to the albumen of the shell egg a total thermal treatment which can be described by an equivalent time and an equivalent temperature which define a point above the "whites" line of FIG. 1 but is insufficient to cause coagulation of either the albumen or the yolk of the shell egg.

In another aspect of the present invention the equivalent time and equivalent temperature define a point above the "yolk" line of FIG. 1, but again insufficient to cause coagulation of either the albumen or the yolk of the shell egg.

Another aspect of the present invention involves heating the shell egg in an aqueous solution of a predetermined temperature and maintaining the shell in the aqueous solution for a predetermined time, wherein the predetermined time and the predetermined temperature provide to the albumen of the shell egg a thermal treatment sufficient to cause a 9D reduction in *S. enteritidis* but insufficient to cause coagulation of the albumen or the yolk of the shell egg. A further aspect of this embodiment involves providing a thermal treatment sufficient to cause a 9D reduction in *S. enteritidis* from the yolk of the shell egg, but again insufficient to cause coagulation of the albumen or the yolk of the shell egg.

Yet another aspect of the present invention provides a method of producing a pasteurized shell egg by heating the shell egg in an aqueous solution of a predetermined temperature and maintaining the shell egg in the aqueous solution for a predetermined time, wherein the predetermined time and the predetermined temperature define a point above the Apparent $F_O$ line of FIG. 1, and wherein the predetermined time and the predetermined temperature are insufficient to cause coagulation of the albumen or the yolk of the shell egg. A further aspect of the present invention provides a thermal treatment wherein the predetermined time and the predetermined temperature define a point below the Expected Salmonella line of FIG. 1.

The present invention is also directed to a pasteurized shell egg, wherein the albumen of said shell egg has received a thermal treatment sufficient to cause a 9D reduction in *Salmonella enteritidis* but insufficient to cause significant coagulation. In another aspect of the thermally treated shell egg, the yolk of the shell egg receives a thermal treatment sufficient to cause a 9D reduction in *Salmonella enteritidis* but insufficient to cause coagulation.

The foregoing and other objects and aspects of the present invention are explained in greater detail in the specification below and the drawings herein, wherein:

DETAILED DESCRIPTION OF THE PREFERRED EMBODIMENTS

The term "shell egg" as used herein refers to poultry eggs, in the shell thereof with the shell essentially unbroken, wherein the egg yolk and the egg white are essentially liquid. Thus it is desired that shell eggs of the present invention contain yolks and whites which are substantially uncoagulated, in contrast to "soft boiled" (i.e., an egg placed in boiling water for three minutes) or "hard boiled" eggs (an egg cooked until both yolk and white are coagulated and solid). While any poultry egg may be used to carry out the present invention (including chicken, turkey, duck, goose, quail, and pheasant eggs), chicken eggs are particularly preferred.

One aspect of the present invention involves the heating of shell eggs in an aqueous solution of a specified temperature for a time sufficient to cause at least a reduction in *Salmonella enteritidis* (SE) of greater than 5 log cycles (5D). More preferably, the shell egg is placed in aqueous solution wherein the time in the solution and the temperature of the solution impart a treatment to the shell egg sufficient to cause a greater than 7D reduction in SE, and most preferably a reduction in SE of greater than 9D. It is preferred that the treatment of the shell egg be sufficient to cause the reduction in SE in the albumen of the shell egg and most preferable that the treatment be sufficient to cause the SE reduction in both the albumen and the yolk of the shell egg. These reductions in SE should be accomplished while retaining the functionality of the shell egg (e.g., maintaining the egg yolk and egg white in essentially liquid form).

Figure 1:
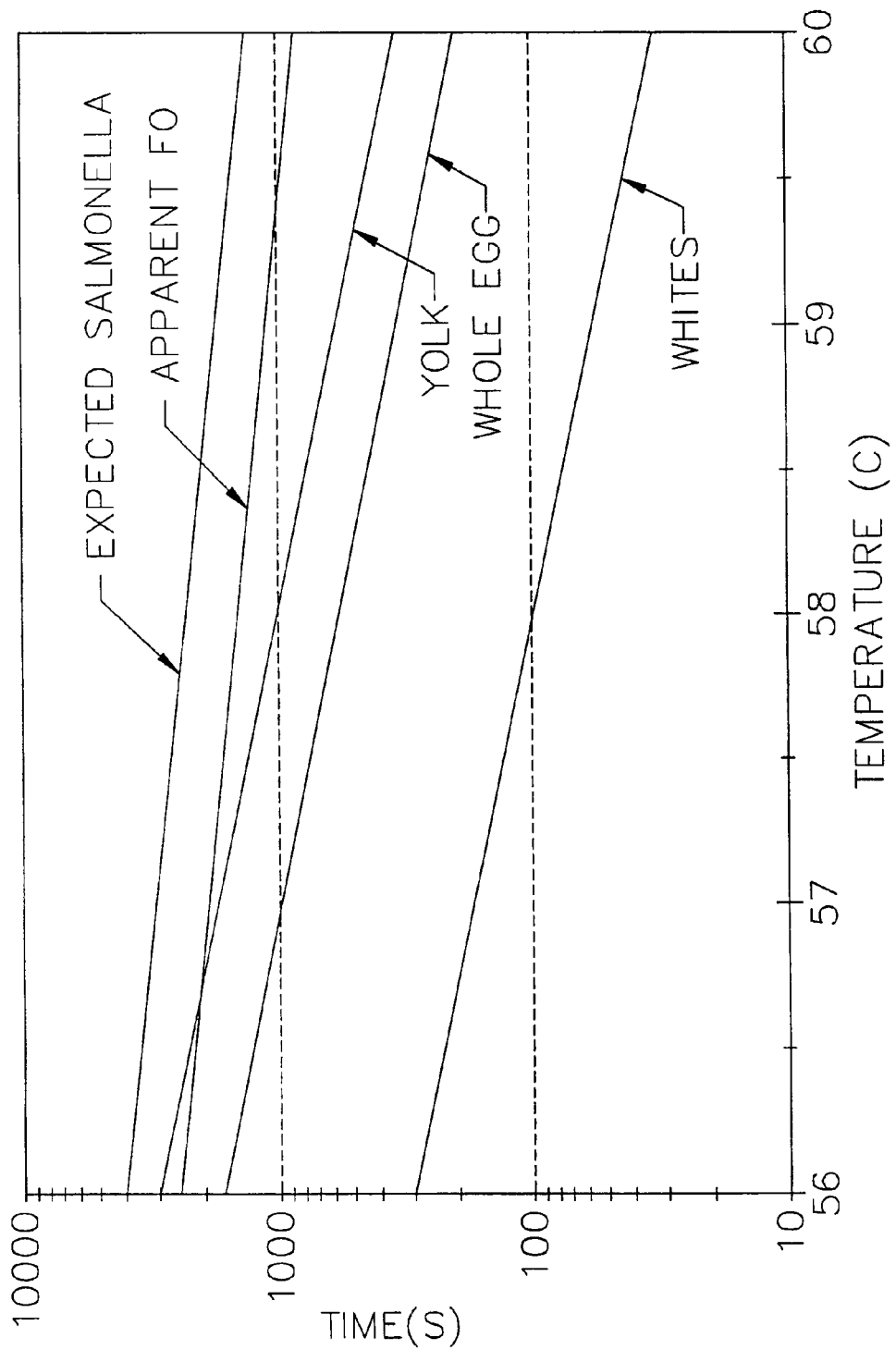
FIG. 1 is a graph of the apparent $F_O$ line superimposed on the thermal death time curves for Salmonella.

For comparative purposes, it is noted that PCT Application No. WO 93/03622 to Cox describes a method of "hyperpasteurization" of shell eggs. As is described in FIG. 10 of Cox, relatively severe thermal treatments are expected to be required before Salmonella is destroyed. The data points shown in FIG. 10 of Cox may be used to construct a line which reflects what would be an expected Salmonella destruction line for shell eggs. This "Expected Salmonella" line is labelled as such and is shown in FIG. 1 herein ("Expected Salmonella") and has the equation log(t)=8.456−0.1183T, where t is time in minutes and T is temperature in °C. However, these more severe thermal treatments could cause loss in functionality to the shell egg (e.g., partial or complete coagulation of the egg yolk or egg white).

Eggs contain air cells, and the liquid component of eggs have gases such as oxygen and carbon dioxide therein. Cox describes altering the natural proportion of indigenous gases in the eggs being treated by means such as infusing oxygen into the egg or withdrawing gases from the egg. In carrying out the present invention, it is preferred that no such treatment steps be carried out which alter the natural indigenous gases present in the shell egg. Thus, the heating, holding, and cooling steps may be carried out at atmospheric pressure.

In the present invention, the thermal treatment employed preferably defines a point below the "Expected Salmonella" line of FIG. 1. Furthermore, the treatment of the shell egg should be insufficient to cause coagulation of either the albumen or the yolk of the shell egg. The methods of the present invention result in a SE negative shell egg having essentially the natural proportion of indigenous gases.

The method of the present invention involves placing shell eggs in an aqueous solution of a predetermined temperature and then maintaining the shell egg in the aqueous solution for a predetermined time sufficient to cause the reductions in SE described above. Preferably the volume of the aqueous solution is sufficiently great to minimize the reduction in temperature of the solution by the addition of the lower temperature shell eggs. Optionally, the eggs may be agitated or the aqueous solution may be circulated about the eggs to facilitate the transfer of heat from the solution to the eggs. Any suitable aqueous solution may be employed, including tap water and water with salt such as NaCl added.

After maintaining the eggs in the aqueous solution for the required time, the eggs may be removed and allowed to cool at room temperature. Cooling may be carried out by other means, such as by direct refrigeration, as long as the treatment received by the shell egg is sufficient to achieve the desired reduction in SE. The heat treatment received by the shell egg after removal from the aqueous solution may be considered in determining the total thermal treatment received by the shell egg, as will be apparent from the discussion below.

As will be appreciated by those skilled in the art, after thermally treating the shell eggs the shell eggs may be oiled or waxed in accordance with known techniques with a suitable edible oil such as mineral oil to improve the keeping quality of the eggs.

In selecting the heating temperatures and times to use in carrying out the present invention, any number of methods may be used, including the equivalent point method of thermal evaluation to determine the total thermal treatment at various locations of the shell egg, including the albumen and the yolk, inoculation studies may be conducted to determine the treatment conditions which yield the desired reduction in SE, or a $F_O$ value could be determined for the shell egg which results in the desired SE reduction. Furthermore, times and temperatures may be selected to give differing reductions in SE in different sections of the shell egg. For example, a time and temperature condition may be selected to provide a 9D reduction in SE in the albumen of the egg while imparting a 7D reduction in the yolk.

While lower temperatures may be used, in practice, aqueous solution temperatures of greater than about 134° F. (or about 56° C.) and less than about 140° F. (or about 60° C.) are preferred and, as discussed above, it is preferred that the temperature of the solution remain approximately constant for the time the shell eggs are heated. Times of from about 20 minutes to about 45 minutes or greater may be selected to achieve the desired reduction in Salmonella with shorter times being required for higher temperatures. The specific times and temperatures required may vary with size, age and pH of the shell egg and whether the shell egg has been oiled before or after thermal treatment.

Figure 2:
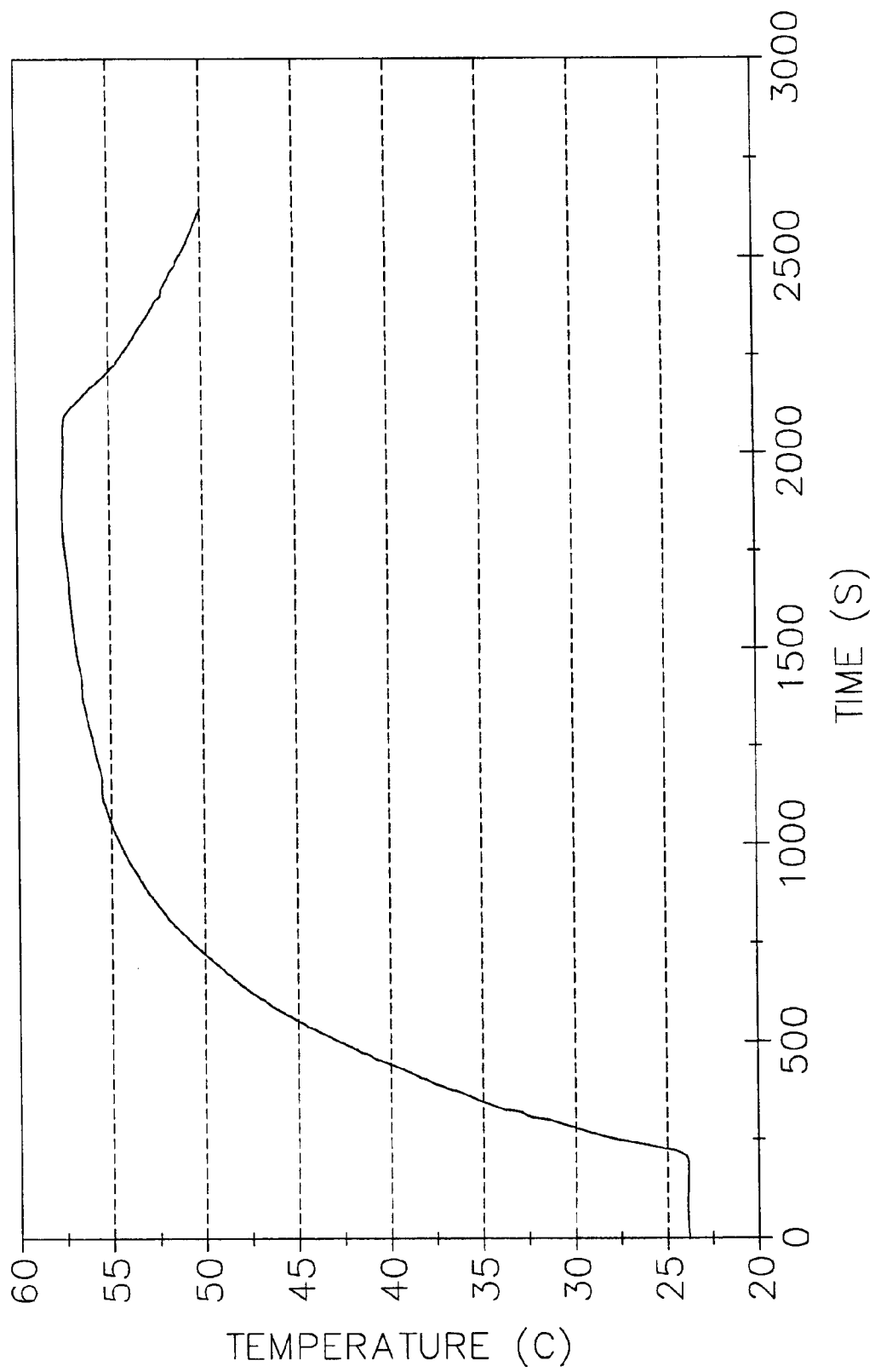
FIG. 2 is a graph of the thermal curve for a representative thermal treatment received by a shell egg according to the methods of the present invention.

If an equivalent point analysis of the thermal treatment received by a particular portion of the shell egg is utilized to determine the reduction of SE in the shell egg, then the resulting equivalent time and equivalent temperature should define a point above the desired Salmonella thermal death time curves such as those shown in FIG. 2 and Table 6 of the USDA Egg Pasteurization Manual, ARS 74-38, Agricultural Research Service, United States Department of Agriculture, Albany, Calif. (1969) which are labelled as such and reproduced in FIG. 1 herein and labelled as "Whites," "Yolk" and "Whole Egg".

If an $F_O$ analysis is employed in carrying out the present invention, then to assure a sufficient reduction in Salmonella such that no shell eggs test positive for Salmonella utilizing approved tests for Salmonella, such as those approved by the USDA for use in liquid egg processing and discussed in the Egg Pasteurization Manual, then actual time and temperature combinations which define points at or above both the Apparent $F_O$ line and the Salmonella thermal death time curve of FIG. 1 should be utilized. As will be understood by one of skill in the art, variations in shell egg physical characteristics, such as size, age, pH, etc., may cause the shell egg "Apparent $F_O$" line of FIG. 1 to shift.

Shell eggs produced by the methods of the present invention preferably receive a thermal treatment such that the shell eggs have a shelf life of 12, 24 or 36 weeks or more under refrigerated conditions. The term "refrigerated" as used herein means the eggs are stored at a temperature of 4° C.

For storage and shipping, shell eggs of the present invention may be packaged in a suitable container, such as egg cartons or egg flats, constructed of materials such as cardboard or plastic polymer.

Shell eggs of the present invention may be used for any purpose for which raw eggs are currently used, including the table-side preparation of Caesar salads, the preparation of fried eggs, the preparation of hard-boiled eggs, the preparation of other egg dishes, baking, etc.

The present invention is explained in greater detail in the following Examples. These Examples are intended to be illustrative of the present invention, and are not to be taken as limiting thereof.

EXAMPLE 1

Salmonella Thermal Resistance

Two experiments were conducted to determine the thermal resistance of SE (Phage type 8) in artificially infected shell eggs and the resulting changes in interior quality due to elevated processing temperatures. During the first experiment fresh shell eggs weighing approximately 62 grams each were obtained from the University research unit. The eggs were dipped in an iodoform solution, excess solution was removed with a cheese cloth and permitted to air dry on sterile plastic egg flats. Each egg was inoculated with $10^6$ viable cells from a 24 hour Trypticase soy broth culture of SE (phage type 8). The shell was perforated with a sterile blunt 18 gauge needle. A sterile blunt glass needle on a $10\mu$ pipet was used to inject the culture near the yolk surface and the hole in the shell was then sealed with a small piece of aluminum foil and Super Glue. Groups of 36 eggs were subjected to temperatures of 22.2 (unheated control), 56, 56.75 and 57.5° C. Eggs within a temperature-group were subjected to a range of heating time periods ranging from 15 to 45 minutes. The study was replicated in time. Heating was carried out in a shaking water bath equipped with polyethylene egg flats perforated with numerous 1 cm holes to increase water circulation around the eggs.

Immediately following the heat treatment, each egg was broken separately and the albumen plus yolk was mixed for 30 seconds in a sterile Stomacher bag containing 200 ml of lactose broth using a Stomacher Lab - Blender 400[1.] The mixed egg content was incubated in a sterile glass container for 24 hours at 39° C. A representative culture was then transferred to selenite-cysteine broth and incubated for 24 hours at 39° C. The incubated culture was streaked on brilliant green agar plates and incubated for 24 hours at 39° C. The suspect colonies were transferred to TSI slants. The second experiment was conducted to evaluate the effect of heating, oiling and storage on interior egg quality. Four storage treatments of zero, one, two and four weeks were used, each with oiled and non-oiled eggs. The eggs were heated in a water bath at 56.75° C. for 36 minutes and 57.5° C. for 23 minutes. Eggs were oiled following heat treatment. Thirty eggs from the control and each treatment were stored at room temperature (22.2° C. and 7.2° C.).

A group of 14 eggs from each variable was used to determine pH, foam volume, whipping time, foam depth, foam stability, grade and a second group of 14 eggs was used to evaluate Haugh units.

EXAMPLE 2

Microbiology

Table 1 presents the results of the thermal treatments on the survival of *S. enteritidis* inoculated into shell eggs. As temperature increased, the time required to obtain Salmonella negative eggs decreased. At 56° C., exposure time required to obtain no positive eggs was greater than 41 minutes. At 56.75 and 57.5° C., exposure times greater than 28 and 23 minutes, respectively, were required to obtain eggs negative for Salmonella. Standard USDA tests for Salmonella were utilized.

TABLE 1

Number of samples positive after heating at 56, 56.75 and 57.5° C.

| Time in Waterbath min. | Temperature of Water | | |
|---|---|---|---|
| | 56° C. •No. − No. + | 56.75° C. No. − No. + | 57.5° C. No. − No. + |
| 15 | | | 12–4 |
| 16 | | 12–11 | |
| 19 | | | 12–2 |
| 20 | | 12–8 | |
| 23 | | | 12–2 |
| 24 | | 12–7 | |
| 27 | | | 12–0 |
| 28 | | 12–2 | |
| 29 | 12–3 | | |
| 31 | | | 12–0 |
| 32 | | 12–0 | |
| 33 | 12–6 | | |
| 37 | 12–4 | | |
| 41 | 12–1 | | |
| 45 | 12–0 | | |

•No. − No. + · Number of samples heated − number positive

EXAMPLE 3

Thermal Evaluation

Times at temperatures where none of the twelve inoculated eggs were positive, were used in a regression equation to determine the thermal death time curve (TDTC) presented in FIG. 1. As the "Apparent $F_O$" line. The equation for the line is:

$$\log (t) = -0.1216 \times T + 8.4274$$

where t is the time in minutes and T is temperature in degrees Centigrade. The $R^2 = 0.86$.

The above equation may be consider a workable approximation or an "Apparent $F_O$" line for *S. enteritidis* in shell eggs. The temperature range and times used to obtain the data were selected with the intent of determining if commercially reasonable thermal treatments would have sufficient lethality for *Salmonella sp*. It is expected that increasing the number of samples and extending the temperature range would result in some changes in the slope of the line, especially at lower temperatures (Cotterill et al., 1973). Based on concerns for the interior quality and their use in cooking, the practical upper temperature range would probably be less than 60° C.. At temperatures in the range of 55 to 65° C., Cotterill et al. (1973) generally found linear TDTC for destruction of *S. oranienburg*. It is anticipated that the $F_O$ line for other forms of Salmonella in shell egg are also linear over that temperature range.

It is established that different strains of Salmonella, the type of egg product, and other environmental conditions will effect the thermal inactivation of Salmonella. Shah et al. (1991) presented D values for 17 strains of *S. enteritidis* in whole egg ranging from 13.7 to 31.3 seconds at 60° C. The average D was 19.2±5.4 sec. and was reported to be similar to previous data. Cotterill et al. (1973) and USDA (1969) provide data showing the influence of egg product type, pH, salt, and sugar on the thermal resistance of *Salmonella sp*. When evaluating the thermal resistance of Salmonella in intact shell eggs, the location of the bacteria within the egg becomes important. The thermal resistance of Salmonella in different egg products is as follows: plain yolk>whole egg or pH 7 egg white>pH 9 egg white (USDA, 1969). Therefore, increased thermal treatments would be required for plain yolk over whole egg or pH 7 egg white or pH 9 egg white.

In this study, the culture was placed in the egg white near the surface of the yolk. The consensus of those actively studying *S. enteritidis* infection of shell eggs is that the bacteria is found in the egg white of naturally infected eggs produced by infected hens (Gast and Beard, *J. Food Prot.*, 55:152–156 (1991); Beard, *Egg Industry*, 92:3337 (1992)). The "Apparent $F_O$" line was plotted in FIG. 1, a redrawing of FIG. 6 from the Egg Pasteurization Manual (USDA, 1969). This allows a visual evaluation of the thermal processes applied to intact shell eggs relative to accepted minimal pasteurization processes for liquid egg products.

When comparing the "Apparent $F_O$" line and actual processes to the lines for pH 9 egg white and whole egg or pH 7 egg white, the shell egg processes seem to be more than adequate to achieve reductions of *S. enteritidis* sufficient for an accepted pasteurization process for protection of public health. The pH of the egg whites in this study ranged from 8.4 to 8.6 which is typical for shell eggs the age of those used in this study.

Although natural infections of the yolk are not expected at the time of ovulation, it is clear that under adverse handling conditions, *S. enteritidis* can be introduced into the egg and grow to very high numbers in the yolk (Hammack et al., *Poultry Science*, 72:373–377 (1993)). At 56° C. (134° F.), if the cells were in the yolk, the minimum holding time would be 36.42 minutes for an adequate pasteurization process. Since the apparent $F_O$ line crosses the USDA yolk pasteurization line at about 134° F., it is therefore preferred that thermal treatments for shell eggs at temperatures above 134° F. be selected.

In addition to the $F_O$ analysis described above, an equivalent point analysis of the time-temperature curve of the thermal treatment imparted to the shell egg may be utilized to determine the total thermal treatment imparted various locations in the shell egg. A temperature probe was inserted into shell eggs in the aqueous solution at various depths into the egg. Temperatures were taken in the albumen at the yolk/albumen interface and in the yolk. These temperatures were taken using a hypodermic needle probe model HYP4-16-1-½-100-EU-48-RP manufactured by BIOMEGA® of Stamford Conn. The probe was inserted into the egg through a cork which was glued to the egg and prevented water from entering the egg through the aperture created by the probe. A DAYTRONIC® System 10 data acquisition unit was connected through an RS-232 serial connection to a personal computer. Temperature measurements were taken every 5 seconds and recorded. A representative thermal curve for a thermal treatment to the shell eggs is shown in FIG. 2. To evaluate the equivalent point for the thermal curve shown in FIG. 2, the thermal reduction relationship ($G_{Ea}$) is calculated using the following equation:

$$G_{Ea} = \int_0^{t_{final}} e^{-\frac{Ea}{RT(t)}} dt$$

where Ea is the activation energy (J/mol), R is the Universal Gas Constant (8.314 J/mol,K), T(t) is temperature as a function of time (°K.) and $t_{final}$ is the final processing time (s). This integration process is then repeated for a number of activation energies (Ea). Each $G_{Ea}$ value defines a line of equivalent thermal treatments for that particular activation energy (Ea). The intersection of the lines defined by the $G_{Ea}$'s is the equivalent point of the thermal process. (Swartzel, 1986, *J. Agric. Food Chem.*, 34:397).

Performing such an equivalent point analysis for the SE negative tests described above results in the following equivalent times and temperatures:

TABLE 2

Equivalent Point Data

| | | Albumen | | Yolk | |
| --- | --- | --- | --- | --- | --- |
| Bath Temp. | Bath Time | Eq. Temp. | Eq. Time | Eq. Temp. | Eq. Time |
| 56° C. | 45 min. | 54.45° C. | 51.14 min. | NA | NA |
| 56.75° C. | 32 min. | 53.0° C. | 39.58 min. | 53.54° C. | 38.41 min. |
| 57.5° C. | 31 min. | 54.86° C. | 38.49 min. | 54.33° C. | 37.47 min. |

From these results an expected reduction in SE may be ascertained or additional thermal conditions predicted to achieve other reductions in SE.

Use of the time and temperature relationships discussed above should result in a shell egg which may be guaranteed to be Salmonella negative. As used herein Salmonella negative means a negative result indicating the absence of harmful Salmonella as determined by USDA approved methods of Salmonella testing. This insured Salmonella negative shell egg is referred to herein as a pasteurized shell egg.

EXAMPLE 4

Quality and Function

Quality and functional attributes of shell eggs heated at 56.75 and 57.5° C. with and without oiling are summarized in Table 2. The expected ability of oiling egg shells to maintain fresh egg pH and interior quality is evident. The egg white pH of the oiled eggs is clearly lower than for the unoiled eggs regardless of storage temperature. The thermal treatments did not seem to have an effect on egg white pH, but did seem to have an impact on interior quality as indicated by the Haugh unit values. For the non-thermally treated eggs, oiling held egg white pH and resulted in higher Haugh values at both storage temperatures. Oiling the thermally treated eggs appeared to help maintain interior quality if they were stored at room temperature (22.2° C.). The thermal treatments alone, provided good protection of interior quality. All thermally treated eggs regardless of oiling or storage temperature would be considered high A or AA quality grades. There seemed to be less correlation of egg white pH with interior quality than might have been expected. This is particularly so when comparing the egg white pH and Haugh units of oiled and unoiled eggs. That result suggests the thermal treatments are stabilizing interior quality independently of deterioration mechanisms related to change in egg white pH. Funk U.S. Pat. No. 2,423,233 (1947) claimed that heating shell eggs for 5 to 40 minutes at temperatures of 60 to 43.4° C., respectively, would maintain interior quality without impairing the whipping qualities. However, he did not define quality or whipping qualities.

TABLE 3

Quality and Functional attributes of thermally treated shell eggs with and without oiling four weeks storage at 22.2 or 7.2° C.

|  | Egg White pH | | Haugh Unit | | Whip Volume[a] | | Whip Time[b] | |
| --- | --- | --- | --- | --- | --- | --- | --- | --- |
|  | 22/2 C. | 7.2 C. | 22.2 C | 7.2 C. | 22.2 C. | 7.2 C. | 22.2 C. | 7.2 C. |
| No Oil | | | | | | | | |
| No Heat | 9.3 | 9.2 | 20 | 60 | 1,000 | 900 | 40 | 45 |
| 56.75 C., 36 min. | 9.2 | 8.9 | 78 | 82 | 550 | 650 | 220 | 110 |
| 57.5 C., 23 min. | 9.2 | 9.1 | 74 | 82 | 750 | 600 | 280 | 130 |
| Oiled | | | | | | | | |
| No Heat | 8.0 | 8.1 | 58 | 70 | 950 | 800 | 45 | 45 |
| 56.75 C., 36 min. | 7.9 | 8.2 | 80 | 80 | 550 | 650 | 190 | 200 |
| 57.5 C., 23 min. | 8.0 | 8.1 | 81 | 82 | 600 | 700 | 200 | 210 |

[a]Whip Volume in ml.
[b]Whip Time in sec.

In this study, the whipping qualities as indicated by whip volume and whip time were adversely effected by the thermal treatments. This indicates that the thermal treatments were substantial and parallel damage that is expected when liquid egg white is pasteurized. Oiling or storage temperature did not seem to have an effect on function of the egg white.

Thermally treated eggs, when broken out onto a plate, appear quite similar to unheated eggs with the exception of some slight opaqueness of the albumen. The normal shape of the thick egg white is maintained and there appears to be the normal amount of outer thin albumen. The yolk membrane may exhibit some weakness. Although yolk indices were not determined, trained observers note some flattening of the yolk relative to unheated controls. The yolk membranes of heated shell eggs did not exhibit any additional fragility over the four week storage and seemed to withstand handling for Haugh unit determinations as expected for eggs of the same interior quality.

The foregoing examples are illustrative of the present invention, and are not to be construed as limiting thereof. The invention is defined by the following claims, with equivalents of the claims to be included therein.

That which is claimed is:

1. A method of producing a pasteurized chicken shell egg, comprising:
    selecting a predetermined time and predetermined temperature so as to achieve at least a 5D reduction in Salmonella within the yolk of said chicken shell egg, and
    heating the chicken shell egg in an aqueous solution for said predetermined temperature;
    holding the chicken shell egg in the aqueous solution for said predetermined time; and
    wherein said predetermined time and said predetermined temperature define a point above the "Apparent $F_O$" line of FIG. 1, and further wherein said predetermined time and said predetermined temperature are insufficient to cause more than insignificant coagulation of the albumen of the chicken shell egg and insufficient to cause more than insignificant coagulation of the yolk of the chicken shell egg.

2. The method of claim 1 wherein said predetermined time and said predetermined temperature also define a point above the "Yolk" line of FIG. 1.

3. The method of claim 1 wherein the chicken shell egg is oiled with an edible oil following said holding step.

4. The method according to claim 1 further comprising the step of cooling the chicken shell egg after said heating and holding step.

5. The method according to claim 4 wherein the pasteurized chicken shell egg has a refrigerated shelf life of at least 12 weeks.

6. A method of producing a pasteurized chicken shell egg, comprising:
    heating the chicken shell egg in an aqueous solution of a predetermined temperature; and
    holding the chicken shell egg in the aqueous solution for a predetermined time; and
    cooling the chicken shell egg after said heating and holding steps;
    wherein said predetermined time and said predetermined temperature provide to the albumen of the chicken shell egg a total thermal treatment described by an equivalent time and an equivalent temperature which define a point above the "Yolk" line of FIG. 1 but insufficient to cause coagulation of the albumen of the chicken shell egg and insufficient to cause coagulation of the yolk of the chicken shell egg, and wherein said equivalent time and said equivalent temperature also define a point below the "Expected Salmonella" line of FIG. 1, and further wherein the pasteurized chicken shell egg has a refrigerated shelf life of at least 12 weeks.

7. A method of producing a pasteurized chicken shell egg, comprising:
    selecting a predetermined time and a predetermined temperature so as to provide to the albumen of the chicken shell egg a total thermal treatment described by an equivalent time and equivalent temperature which define a point above the "Yolk" line of FIG. 1 but insufficient to cause more than insignificant coagulation of the albumen of the chicken shell egg and insufficient to cause more than insignificant coagulation of the yolk of the chicken shell egg, and wherein said equivalent time and said equivalent temperature also define a point below the "Expected Salmonella" line of FIG. 1, and further wherein said predetermined time and said predetermined temperature are sufficient to cause a 5D reduction in *Salmonella enteriditis* in the yolk of the chicken shell egg;

heating the chicken shell egg in an aqueous solution of said predetermined temperature of at least about 56° C.; and holding the chicken shell egg in the aqueous solution for said predetermined time of at least about 20 minutes; and cooling the chicken shell egg after said heating and holding steps.

8. A method of producing a pasteurized chicken shell egg, comprising:

selecting a predetermined time and a predetermined temperature so as to provide to the albumen of the chicken shell egg a total thermal treatment described by an equivalent time and equivalent temperature which define a point above the "Yolk" line of FIG. 1 but insufficient to cause more than insignificant coagulation of the albumen of the chicken shell egg and insufficient to cause more than insignificant coagulation of the yolk of the chicken shell egg, and wherein said equivalent time and said equivalent temperature also define a point below the "Expected Salmonella" line of FIG. 1, and further wherein said predetermined time and said predetermined temperature are sufficient to cause a 7D reduction in *Salmonella enteriditis* in the yolk of the chicken shell egg;

heating the chicken shell egg in an aqueous solution of said predetermined temperature of at least about 56° C.; and holding the chicken shell egg in the aqueous solution for said predetermined time of at least about 20 minutes; and cooling the chicken shell egg after said heating and holding steps.

9. A method of producing a pasteurized chicken shell egg, comprising:

selecting a predetermined time and a predetermined temperature so as to provide to the albumen of the chicken shell egg a total thermal treatment described by an equivalent time and equivalent temperature which define a point above the "Yolk" line of FIG. 1 but insufficient to cause more than insignificant coagulation of the albumen of the chicken shell egg and insufficient to cause more than insignificant coagulation of the yolk of the chicken shell egg, and wherein said equivalent time and said equivalent temperature also define a point below the "Expected Salmonella" line of FIG. 1, and further wherein said predetermined time and said predetermined temperature are sufficient to cause a 9D reduction in *Salmonella enteriditis* in the yolk of the chicken shell egg;

heating the chicken shell egg in an aqueous solution of said predetermined temperature of at least about 56° C.; and holding the chicken shell egg in the aqueous solution for said predetermined time of at least about 20 minutes; and cooling the chicken shell egg after said heating and holding steps.

10. A method of producing a pasteurized chicken shell egg, comprising:

selecting a predetermined time and a predetermined temperature so as to provide to the albumen of the chicken shell egg a total thermal treatment described by an equivalent time and equivalent temperature which define a point above the "Yolk" line of FIG. 1 but insufficient to cause more than insignificant coagulation of the albumen of the chicken shell egg and insufficient to cause more than insignificant coagulation of the yolk of the chicken shell egg, and wherein said equivalent time and said equivalent temperature also define a point below the "Expected Salmonella" line of FIG. 1;

heating the chicken shell egg in an aqueous solution of said predetermined temperature of at least about 56° C.; and holding the chicken shell egg in the aqueous solution for said predetermined time of at least about 20 minutes; and cooling the chicken shell egg after said heating and holding steps;

wherein the pasteurized chicken shell egg has a refrigerated shelf life of at least 12 weeks.

* * * * *